US007535574B2

(12) United States Patent
Beckwith et al.

(10) Patent No.: US 7,535,574 B2
(45) Date of Patent: May 19, 2009

(54) BASEPLATE FOR A RING LASER GYROSCOPE

(75) Inventors: Timothy A. Beckwith, Coon Rapids, MN (US); William M. Brintz, Lino Lakes, MN (US)

(73) Assignee: Honeywell International Inc., Morristown, NJ (US)

( * ) Notice: Subject to any disclaimer, the term of this patent is extended or adjusted under 35 U.S.C. 154(b) by 251 days.

(21) Appl. No.: 11/537,076

(22) Filed: Sep. 29, 2006

(65) Prior Publication Data

US 2008/0079948 A1 Apr. 3, 2008

(51) Int. Cl.
*G01C 19/64* (2006.01)
(52) U.S. Cl. ...................................... 356/459
(58) Field of Classification Search .......... 356/459–476
See application file for complete search history.

(56) References Cited

U.S. PATENT DOCUMENTS

| | | | |
|---|---|---|---|
| 4,383,763 A | | 5/1983 | Hutchings et al. |
| 4,488,080 A | | 12/1984 | Baumann |
| 4,691,323 A | * | 9/1987 | Ljung et al. ............... 372/107 |
| 4,824,253 A | * | 4/1989 | Butler et al. ............... 356/469 |
| 5,148,076 A | | 9/1992 | Albers et al. |
| 5,162,870 A | * | 11/1992 | Toth .......................... 356/469 |
| 5,311,280 A | * | 5/1994 | Koper et al. ............... 356/469 |
| 5,359,413 A | * | 10/1994 | Chang et al. .............. 356/469 |
| 5,420,685 A | | 5/1995 | Podgorski |
| 5,780,771 A | | 7/1998 | Beckwith et al. |
| 5,867,270 A | | 2/1999 | Beckwith et al. |
| 5,950,995 A | | 9/1999 | Beckwith et al. |
| 5,960,025 A | | 9/1999 | Thorland et al. |
| 6,072,580 A | | 6/2000 | Barnes et al. |
| 6,564,670 B2 | * | 5/2003 | Feng et al. ................. 74/502.2 |
| 6,728,286 B2 | | 4/2004 | Thorland et al. |
| 7,460,241 B2 | * | 12/2008 | Heffner et al. ............. 356/465 |

OTHER PUBLICATIONS

"Flange," Merriam-Webster Online, Jul. 29, 2008. <http://www.merriam-webster.com/dictionary/flange>.*

* cited by examiner

*Primary Examiner*—Patrick J Connolly
*Assistant Examiner*—Scott M Richey
(74) *Attorney, Agent, or Firm*—Fogg & Powers LLC

(57) ABSTRACT

A path length control driver for a ring laser gyroscope includes a baseplate, a number of piezoelectric elements, and electrodes. The baseplate includes openings selectively sized and located on the baseplate for reducing distortion thereof during thermal or other mechanical loading. The baseplate includes a central hub extending from a central portion of an actuator plate, which comprises an annular diaphragm member. The baseplate further includes an outer rim or sidewall coupled to the actuator plate and a baseplate flange extending from the sidewall. In one embodiment, a portion of the baseplate flange is attached to a mirror transducer substrate assembly. The mirror transducer substrate assembly includes a reflective device, such as a mirror, and a transducer block. The transducer block includes an optical contact surface onto which the mirror is affixed. The piezoelectric elements are employed to achieve a desired amount of movement of the baseplate, which in turn induces micro-movements or micro-adjustments of the mirror.

7 Claims, 3 Drawing Sheets

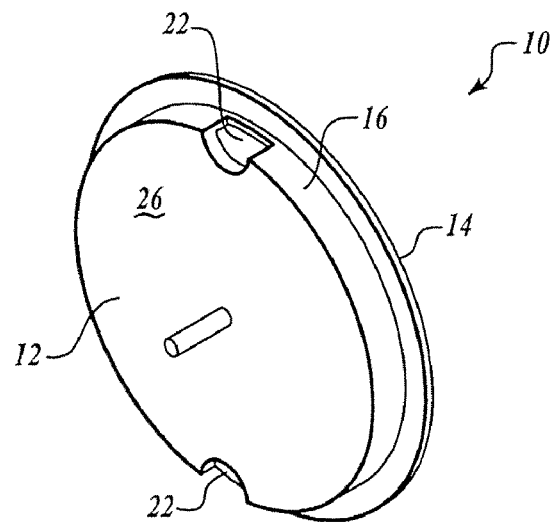
FIG.1 (PRIOR ART)
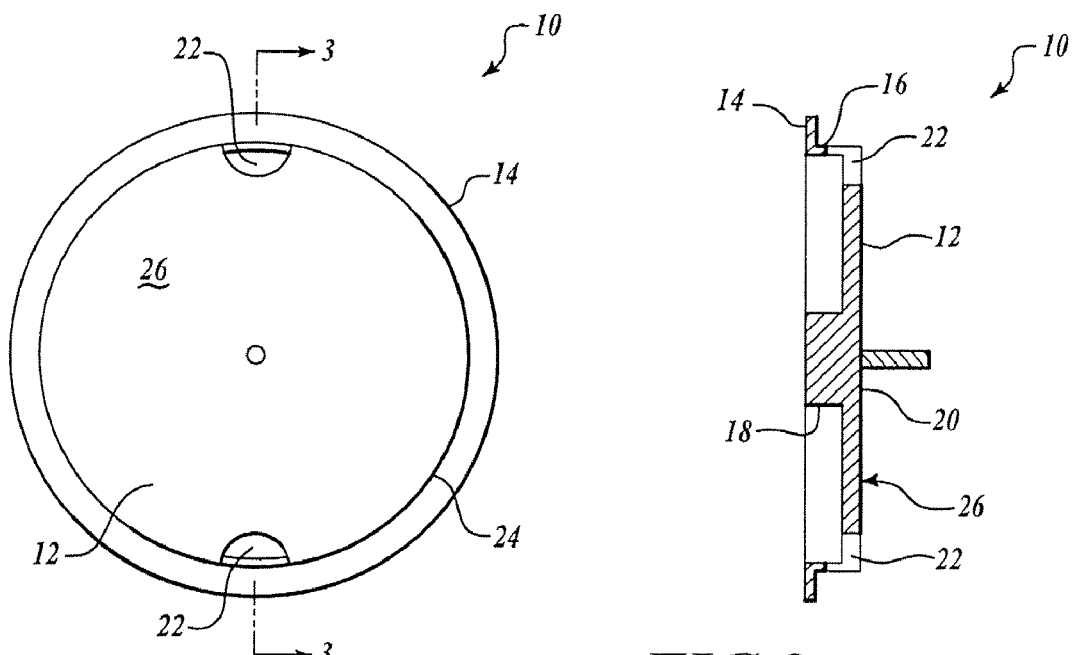
FIG.2 (PRIOR ART)
FIG.3 (PRIOR ART)

BASEPLATE FOR A RING LASER GYROSCOPE

BACKGROUND OF THE INVENTION

A ring laser gyroscope (RLG), sometimes referred to as a ring laser angular rate sensor or short handedly referred to as a ring laser gyro, is used in navigational and guidance systems for a land, air, and/or space vehicles. The RLG utilizes laser beams traveling in opposite directions within a closed loop optical path that are directed by a plurality of reflective devices, such as mirrors. By way of example, an angular orientation of the vehicles is detected with signal processing electronics (e.g., photodiodes), which compares a frequency differential caused by different path lengths of the two beams.

A conventional RLG includes a laser block, a path length control (PLC) driver, and a mirror transducer substrate assembly. The PLC driver generally includes a baseplate, piezoelectric elements, and conductive elements. The mirror transducer substrate assembly generally includes a transducer block with a reflective device, such as a mirror affixed thereto. The structural relationships of the components and operation of the RLG are shown and described in detail in U.S. Pat. No. 5,148,076. In addition, the '076 patent describes one type of configuration for the mirror transducer substrate assembly where a non-uniform outer wall thickness of the transducer block reduces mirror and optical surface deformation. Other aspects generally related to the structural configuration and/or operation of RLGs, such as controllable mirrors, piezoelectric control elements, path length controllers, and the like are described in U.S. Pat. Nos. 4,383,763; 4,488,080; 4,691,323; 5,420,685; 5,960,025; and 6,728,286.

In one embodiment of an RLG, which is shown in FIGS. 1-3, a baseplate 10 includes an actuator plate 12, a flange 14, and an outer rim or sidewall 16. The baseplate 10 includes a hub 18 coupled to and laterally extending from a central portion 20 of the actuator plate 12. The baseplate 10 further includes openings 22 that extend through the sidewall 16, continue around the sidewall/actuator plate interface 24, and extend through the actuator plate 12 itself. The openings 22 allow conductive elements to be routed through the baseplate 10 from a flange side 26 of the baseplate 10. The '076 patent describes one method of routing conductive elements in a PLC driver where the conductive elements make electrical contact with terminal posts via a flex tape and wiring harness.

The openings 22 are electro-discharge machined (EDM) into the baseplate 10. The thermal and mechanical strains created in the baseplate 10 during the EDM process tend to distort, deform, or otherwise warp the baseplate 10. This distortion in the baseplate may be significant enough to cause the mirror transducer substrate assembly, and thus the mirrors, to be out of alignment with a laser optical path within the laser block. In addition or alternatively, this distortion, when combined with the distortion resulting from bonding the PLC driver with the mirror transducer substrate assembly, may cause misalignment of the mirrors. Hence, this distortion of the baseplate 10 is transmitted through the transducer block and results in distortion of the optical contact surface, which is defined as the surface where the mirror is bonded or otherwise affixed to the transducer block.

After the mirror is contacted to the block, the PLC driver is bonded on the backside of the transducer mirror. The block assembly then goes through an initial mirror/block alignment check using a combination of an external laser beam and laser block bending. When it is deemed necessary to make a mirror move, the transducer/mirror assembly is removed from the laser gyro body. Problems can arise when this assembly is removed from the block such as the optical contact area warping. This warping can be severe enough that the mirror/transducer assembly will not go back into contact with the block. When this situation occurs it requires either a re-polish of the optical contact area (with driver attached) or driver removal which results in scrapping the driver assembly. Re-polish of the mirror with a transducer bonded on to achieve a optical contactable flat interface presents the problem of an out of flat mirror once the PLC driver is removed and the mirror is re-used.

Accordingly, a need exists for a baseplate in a PLC driver of an RLG system that overcomes at least some of the aforementioned drawbacks.

SUMMARY OF THE INVENTION

According to at least one embodiment of the invention, a baseplate for a path length control (PLC) driver of a ring laser gyroscope (RLG) includes openings formed in the baseplate to alleviate and/or reduce an amount of distortion of the baseplate. The openings are uniquely shaped and positioned to permit a more uniform distribution throughout the baseplate of internal, residual, or other dimensional strains accumulated during thermal or other mechanical loading. The dimensional strains may develop and accumulate during assembly, operation, disassembly, and/or re-assembly of the PLC driver.

In one aspect of the invention, a baseplate for a ring laser gyroscope includes an annular plate having a central portion with a hub extending laterally therefrom; a sidewall coupled to the annular plate; a transducer block mounting flange extending radially, outwardly from the sidewall and substantially parallel to the annular plate; and at least one opening extending through only the sidewall.

In another aspect of the invention, a path length controller for a ring laser gyroscope includes a baseplate having an annular plate, a sidewall, a transducer block mounting flange, and at least one opening extending through the sidewall, the annular plate having a central portion with a hub extending laterally therefrom; the sidewall coupled to the annular plate; the transducer block mounting flange extending radially, outwardly from the sidewall; and the at least one opening extending through the sidewall and located between the annular plate and the transducer block mounting flange; and a mirror transducer substrate assembly comprising a transducer block coupled to a reflective surface, the transducer block coupled to the transducer block mounting flange of the baseplate.

As will be readily appreciated from the foregoing summary, the invention provides a baseplate with openings that improve the distortion characteristics by permitting strains in the baseplate to be more uniformly distributed.

BRIEF DESCRIPTION OF THE DRAWINGS

The preferred and alternative embodiments of the present invention are described in detail below with reference to the following drawings:

FIG. 1 is an isometric view of a prior art baseplate for a ring laser gyroscope;

FIG. 2 is a top, plan view of the prior art baseplate of FIG. 1;

FIG. 3 is a cross-sectional view of the prior art baseplate of FIG. 1 taken along line 3-3 of FIG. 2;

DETAILED DESCRIPTION OF THE PREFERRED EMBODIMENT

In the following description, certain specific details are set forth in order to provide a thorough understanding of various embodiments of the invention. In other instances, well-known structures and methods associated with ring laser gyroscopes (RLGs) and methods of making and/or assembling the same may not be shown or described in detail to avoid unnecessarily obscuring descriptions of the embodiments of the invention.

The following description generally relates to a baseplate of a having reduced distortion or deformation characteristics. As is generally known in the art and described in U.S. Pat. No. 5,420,685, the RLG includes a laser block, a path length control (PLC) driver, and a mirror transducer substrate assembly. The PLC driver includes a baseplate, a number of piezoelectric elements, and a conductive network. The mirror transducer substrate assembly includes a transducer block and a reflective device affixed thereto. The mirror transducer substrate assembly is affixed to the laser block and the PLC driver is affixed to the mirror transducer substrate assembly.

Figure 4:
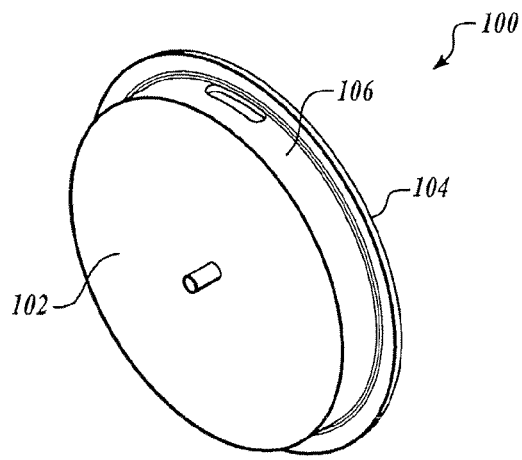
FIG. 4 is an isometric view of a baseplate for a ring laser gyroscope according to one embodiment of the present invention.
Figures 5, 6:
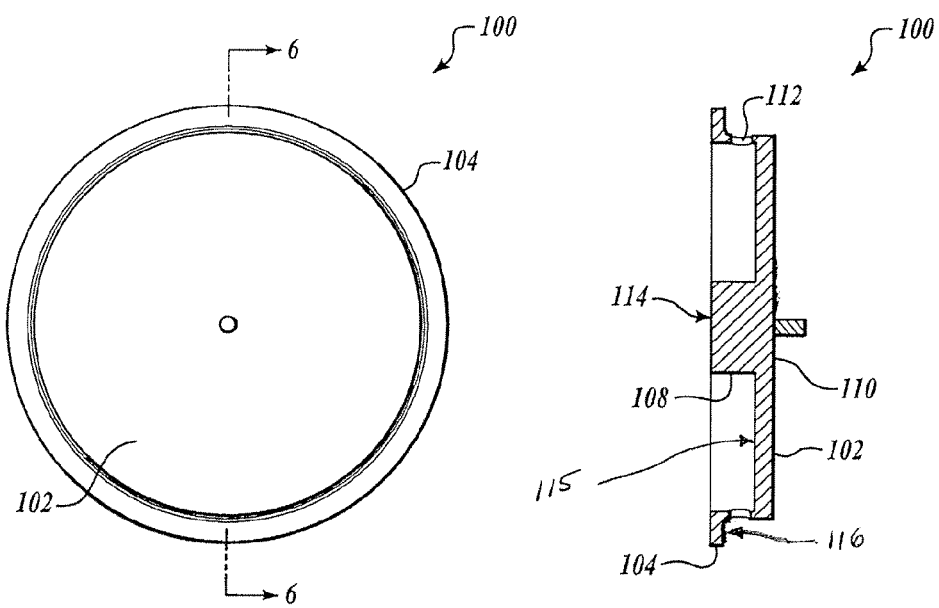
FIG. 5 is a top, plan view of the baseplate of FIG. 4.
FIG. 6 is a cross-sectional view of the baseplate of FIG. 4 taken along line 6-6 of FIG. 5.

FIGS. 4-6 show a baseplate 100 having an actuator plate 102, a transducer block mounting flange 104, and an outer rim or sidewall 106, according to one embodiment. The baseplate 100 includes a hub 108 coupled to and laterally extending from a central portion 110 of the actuator plate 102. The sidewall 106 is coupled to and extends between the actuator plate 102 and the mounting flange 104, respectively. The mounting flange 104 extends radially outward from the sidewall 106 in a direction that is substantially parallel to the actuator plate 102. The baseplate 100 further includes one or more openings 112 that extend through only the sidewall 106 of the baseplate 100. The components of the baseplate 100, the actuator plate 102, the mounting flange 104, and the sidewall 106, can be integrally formed (e.g., a monolithic component), or can be bonded or otherwise coupled together.

In one embodiment, the actuator plate 102 has an annular shape and includes a hub surface 114 and a diaphragm surface 115. The diaphragm surface 115 is located between the sidewall 106 and the hub 108. In addition, the mounting flange 104 includes a flange surface 116 that faces the diaphragm surface 115 of the actuator plate 102. The opening 112 that extends through only the sidewall 106 of the baseplate 100 is located between the flange surface 116 and the diaphragm surface 115, and thus does not extend at all into the actuator plate 102.

In the illustrated embodiment, the openings 112 are a pair of openings positioned radially opposite of each other, each opening is located between the flange surface 116 and the diaphragm surface 115 of the actuator plate 102. In one embodiment, the openings 112 are oval or elliptical shaped. Additional openings may be included in the sidewall 106. Moreover, the sizing, configuration, spacing, and number of the openings 112 may be varied depending on particular design goals or specifications for the RLG.

Consequently, the baseplate 100 includes at least one opening 112 arranged in the sidewall 106. The opening 112 is EDM'd, but sized, configured, and located to more uniformly distribute the strains that are developed in the baseplate 100 during the EDM process and/or subsequent assembly processes. Accordingly, these openings 112 substantially reduce, if not eliminate, distortion or deformation of the baseplate 100.

Figure 7:
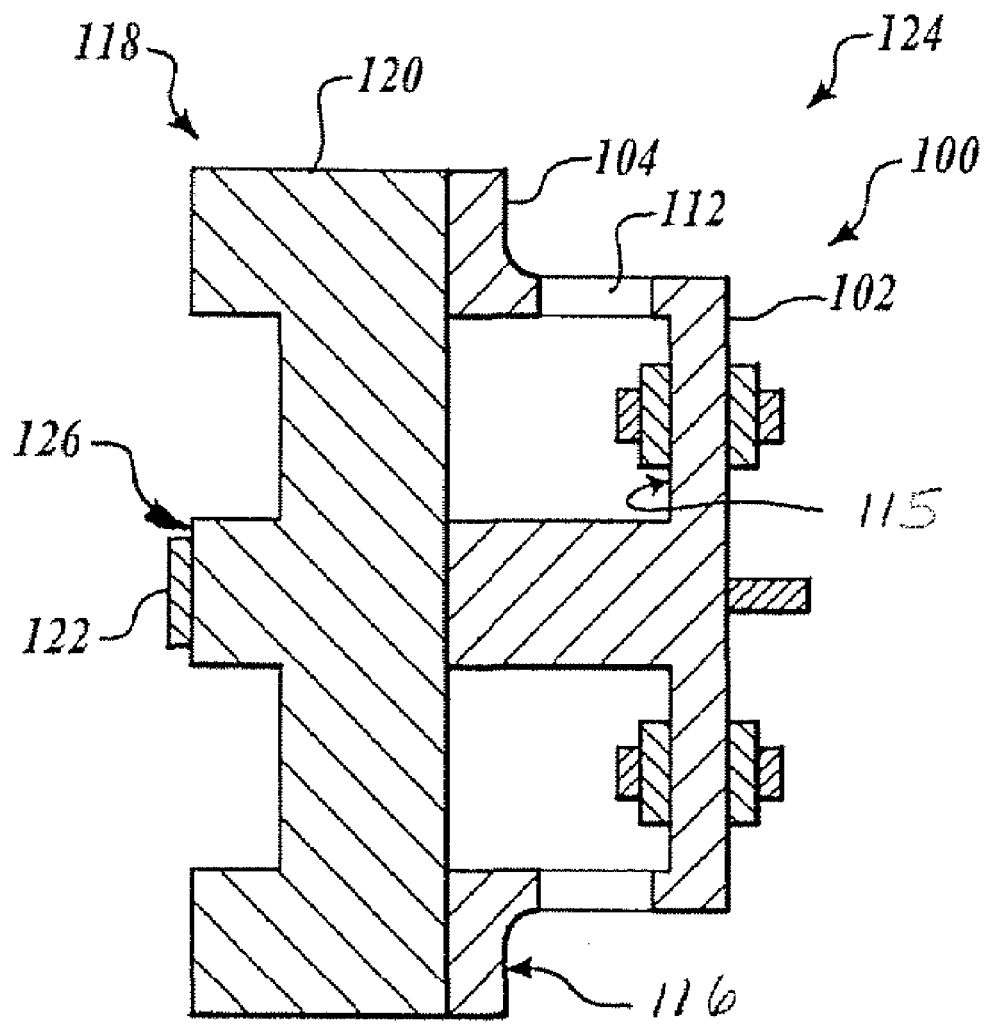
FIG. 7 is a cross-sectional view of the baseplate of FIG. 4 coupled to a mirror transducer substrate assembly according to one embodiment of the present invention.

By way of example and as shown in FIG. 7, the size, configuration, and location of the openings 112 in the sidewall 106 provides a reduction in the distortion of the baseplate 100 and a reduction in the related distortion of a mirror transducer substrate assembly 118, which includes a transducer block 120 and a mirror 122. In particular, the openings 112 provide a reduction in the distortion between the transducer block 120 and the mirror 122 of about 67% when compared to the baseplate 10 shown in FIGS. 1-3. The openings 112 permit a PLC driver 124 and mirror transducer substrate assembly 118 to be decoupled from one another and/or decoupled from an RLG laser block (not shown) while achieving minimal to no surface distortion of the baseplate 100 and/or of the mirror mounting surface 126 of the mirror transducer substrate assembly 118. In one embodiment, the baseplate 100, the transducer block 120, and the laser block are made of a material having a low coefficient of thermal expansion, for example Invar®.

The baseplate according to at least one embodiment herein reduces the optical contact distortion to the point where virtually all parts go into optical contact without a need to re-polish the mirror. This eliminates the out of flat mirror after the PLC driver is removed from a re-worked part. Since the parts do not need to be re-polished due to minimal contact area distortion, there is no need to remove the PLC driver to get the mirror into contact. In addition, the amount of scrapped driver assemblies may be greatly reduced.

The various embodiments described above can be combined to provide further embodiments. All of the above U.S. patents, patent applications and publications referred to in this specification, to include U.S. Pat. Nos. 4,383,763; 4,488,080; 4,691,323; 5,148,076; 5,420,685; 5,960,025; and 6,728,286 are incorporated herein by reference. Aspects can be modified, if necessary, to employ devices, features, and concepts of the various patents, applications, and publications to provide yet further embodiments.

These and other changes can be made in light of the above detailed description. In general, in the following claims, the terms used should not be construed to limit the invention to the specific embodiments disclosed in the specification and the claims, but should be construed to include all types of ring laser gyroscopes and components thereof, to include but not limited to methods of making and/or assembling ring laser gyroscopes that operate in accordance with the claims.

While the preferred embodiment of the invention has been illustrated and described, as noted above, many changes can be made without departing from the spirit and scope of the invention. For example, the openings in the baseplate may vary in size, shape, and/or number. The amount of distortion reduction may be much less or much greater than about 67% when compared to the baseplate 10 shown in FIGS. 1-3. Accordingly, the scope of the invention is not limited by the disclosure of the preferred embodiment. Instead, the invention should be determined entirely by reference to the claims that follow.

What is claimed is:

1. A baseplate for a ring laser gyroscope comprising:
   an annular plate having a central portion with a hub extending laterally therefrom;
   a sidewall coupled to the annular plate;
   a transducer block mounting flange extending radially, outwardly from the sidewall and substantially parallel to the annular plate; and at least one pair of openings extending through only the sidewall, the openings located substantially radially opposite from one another, each opening having approximately an elliptical shape sized to uniformly distribute strains in the baseplate that are generated during assembly of the ring laser gyroscope.

2. The baseplate of claim 1, wherein the annular plate includes a diaphragm surface located between the sidewall and the hub.

3. The baseplate of claim 1, wherein the annular plate, the sidewall, and the transducer block mounting flange comprise a monolithic component.

4. A path length controller for a ring laser gyroscope comprising:

a baseplate having an annular plate, a sidewall, a transducer block mounting flange, and at least one pair of openings extending through the sidewall, the annular plate having a central portion with a hub extending laterally therefrom; the sidewall coupled to the annular plate; the transducer block mounting flange extending radially, outwardly from the sidewall, and the at least one pair of openings are located between the annular plate and the transducer block mounting flange, wherein the openings are located substantially radially opposite from one another, each opening having approximately an elliptical shape sized to uniformly distribute an amount of residual strain in the baseplate that is generated during assembly of the ring laser gyroscope; and a mirror transducer substrate assembly comprising a transducer block coupled to a reflective surface, the transducer block coupled to the transducer block mounting flange of the baseplate.

5. The path length controller of claim 4, wherein the annular plate includes a diaphragm surface located between the sidewall and the hub.

6. The path length controller of claim 4, wherein the annular plate, the sidewall, and the transducer block mounting flange comprise a monolithic component.

7. The path length controller of claim 4, wherein the reflective surface is a mirror.

* * * * *